Dec. 8, 1925.
O. V. KARLSSON
MICROMETER
Filed Feb. 5, 1924
1,564,857
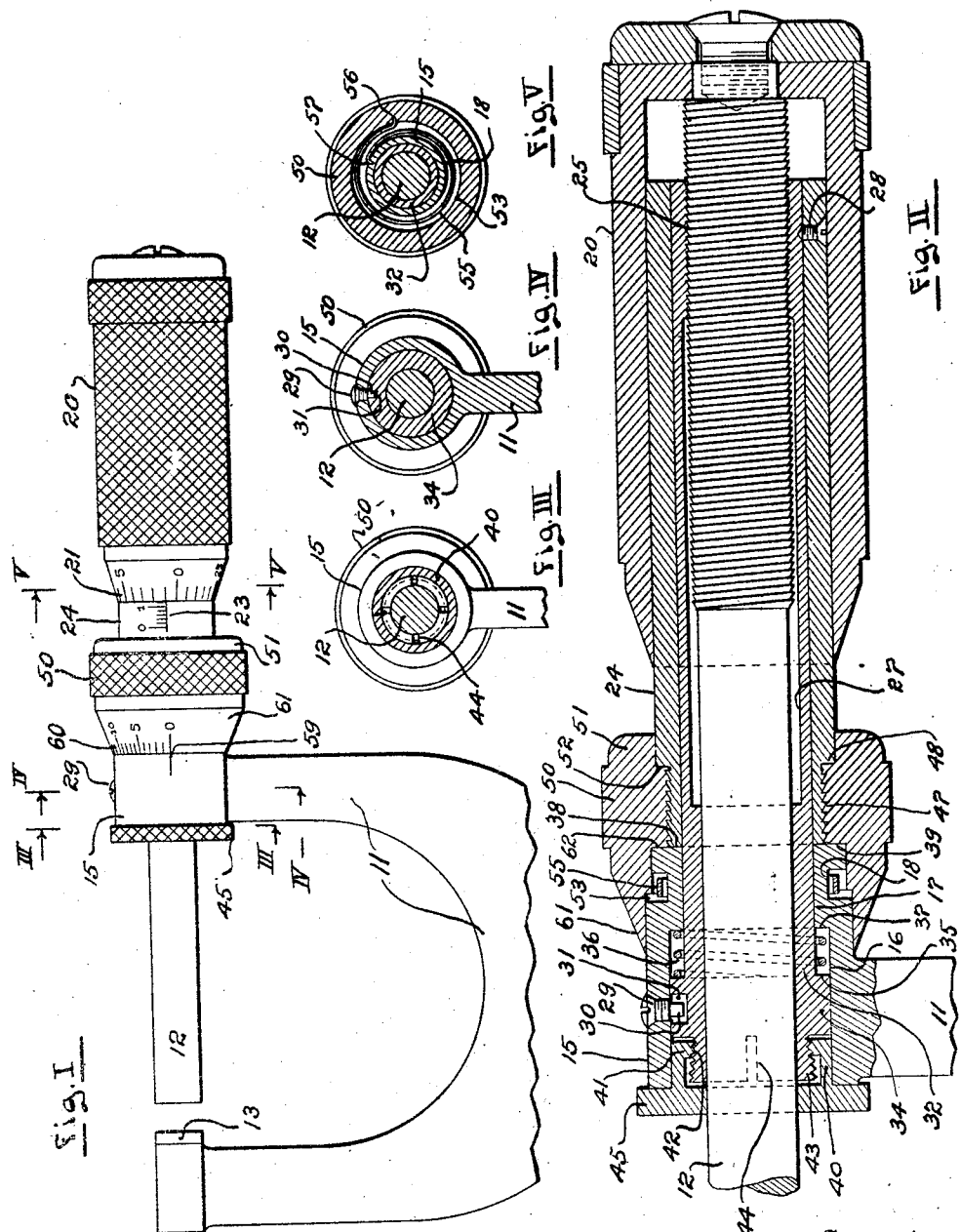
Inventor
Oscar V. Karlsson
By his Attorney
H C Karlson Patented Dec. 8, 1925.

1,564,857

UNITED STATES PATENT OFFICE.

OSCAR V. KARLSSON, OF ARLINGTON, NEW JERSEY.

MICROMETER.

Application filed February 5, 1924. Serial No. 690,786.

*To all whom it may concern:*

Be it known that I, OSCAR V. KARLSSON, a resident of Arlington, in the county of Hudson and State of New Jersey, have invented certain new and useful Improvements in Micrometers, of which the following is a specification.

The present invention relates to a micrometer particularly adapted for the measurement of tolerance increments.

The object of the invention is to provide a micrometer gage which when employed for the calibration of tolerances, directly registers the size or amount thereof, and further is capable by means of suitable adjustment of being used as ordinarily, for measuring various dimensions.

Another object is to produce a micrometer having a spindle that will admit both of axial displacement thru rotation thereof, and a translatory movement without turning it.

A further object is so to connect the micrometer spindle with a revolvable element as to effect rotation of the latter when the said spindle is being translated without turning.

Other objects and advantages of the invention will become apparent as the specification proceeds.

With the aforesaid objects in view, the invention consists of the novel combinations and arrangements of parts hereinafter described in their preferred embodiments, pointed out in the subjoined claims, and illustrated on the annexed drawing, wherein like parts are designated by the same reference characters throughout the several views.

On the said drawing which affords one exemplification of the invention:—

Figure I is a side view thereof, part of the micrometer frame being broken away;

Fig. II is an enlarged longitudinal section of the right hand portion of this improved measuring instrument, taken in the position shown in the preceding figure; and Figs. III, IV and V are cross-sections taken on the lines III—III, IV—IV and V—V, respectively, of Figure I, looking towards the right.

In these views, the numeral 11 designates the usual C or U shaped frame of the micrometer, 12 its spindle, and 13 the anvil stud wherewith the latter coacts. The branch of the said frame opposite the anvil is formed with a hub 15 having a bore 16 and adjacent thereto a bearing 17 of reduced diameter, besides being provided externally of the latter with an annular groove 18. The purpose of the parts last referred to will be later on pointed out.

Connected, in a well known manner, to the outer or threaded end of the spindle 12, is a sleeve 20, which may be termed the primary registering element, carrying in common with instruments of this kind, circumferential graduations 21 at its inner bevelled edge. The divisions 21 coact, as usual, with a scale 23 formed longitudinally on the surface of a relatively stationary barrel member 24. The measuring spindle 12 has, as ordinarily, threaded engagement with internal screw-threads 25 pertaining to the said barrel. In the embodiment shown, the threads 25 may be formed interiorly at one terminal of a bushing 27 affixed as by a stop-screw 28 to the barrel 24, and extending beyond the same into the bore 16 of the hub 15, being further guided by the bearing 17 of the latter.

Means are provided for maintaining the component parts of the barrel member against rotation, while permitting at option, a limited axial displacement thereof. The means spoken of, may consist of a screw 29 threaded approximately thru the middle portion of the hub 15, and having its cylindrical inner extremity 30 received within an endwise closed guide slot 31 cut in the inwardly extending portion 32 of the barrel member 24, that is, in the bushing 27, when the same is a separate part of the former. If desired, the means referred to, namely the one denoted by the numeral 31, may be formed in a collar or flanged enlargement 34 which can be made integral with the extension 32 of the bushing 27, and is shown as having a working fit within the bore 16.

The outer shoulder 35 of the said collar affords an abutment for one end of a compression spring 36, the opposite extremity whereof is lodged against the bottom 37 of the said bore 16. The spring mentioned constitutes means for restoring the barrel member, after axial movement, to its initial position, and contemporaneously keeping a shoulder or offset 38 thereof, in contact with the outer face 39 of the hub 15.

Other means are supplied for locking the extending portion 32 of the member 24 to the spindle 12. As seen to best advantage at the left of Fig. II, these means may comprise an internally recessed nut 40, entered into the mouth of the bore 16, and having its threads 41 engaging those formed at the extremity of the portion 32, as denoted at 42. The last named threads are preferably made on a taper, increasing towards the inner or gap end of the said portion, as indicated by the numeral 43. The latter end is also provided with slits or cuts 44, affording the same a certain amount of resiliency, on the order of a spring-collet. In the position shown, the nut 40 is screwed down upon the reduced diameter of the threads 42, and stands with the side of its knurled flange 45 up against the inner face of the hub 15. The spindle 12 is then freely rotatable relatively to the bushing 27, and the therewith associated barrel 24. Both of the last named pieces are at such times held in their normal location by the spring 36, while the sleeve 20 may be revolved independently thereof, to enable a measurement taken intermediate the opposed transverse faces of the spindle 12 and the anvil 13, to be read or registered on the coacting graduation 21, 24, according to accepted practice.

Adjacent to the shoulder part 38, the member 24 is provided with a threaded portion 47, the opposite or outer termination whereof forms another offset 48. A secondary sleeve or registering element 50 is mounted to rotatably engage the threads on the said portion 47, and one extremity 51 of the former overlaps the adjoining end of the barrel 24, embodying also an abutment 52 which is normally in contact with the offset 48. The other inwardly facing extremity of the secondary element is provided with a recess 53 which takes over the outer portion of the hub 15.

The means for imparting rotation to the element 50, includes in the present exemplification of the invention, a spiral spring 55, the opposite terminals 56—57 whereof are anchored in suitable notches provided therefor on the inside of the recess 53 and in the bottom of the groove 18, in the said hub 15, respectively. Initial tension applied to the spring 55, tends to unscrew the said element 50 from the threads 47. But the said spring 55 is not sufficiently powerful to overcome the force of the resilient medium 36 that holds the offset 38 of the member 24 in contact with the outer face of the hub 15. This hub, although fixed, stands in the same relation to the secondary sleeve 50 as does the barrel 24 to the primary sleeve 20. Immediately the barrel member 24 and the therewith coacting spindle 12 and sleeve 20 are moved axially outward, that is, in a right hand direction with respect to the present delineation of the device under consideration, the actuating spring 55 that impels the secondary sleeve 50, commences to wind the said sleeve off the threads 47. The farther the coacting contacts 38, 39, are moved apart, the greater becomes the arc according to which the sleeve 50 is turned. The amount of twist given to the latter is ascertainable thru the rotative displacement between co-operating graduations 59, 60 marked on the inner bevelled portion 61 of the said sleeve 50 and the hub member 15, respectively. The arcuate movement referred to can only occur upon the clamping of the extension 32 of the member 24 to the spindle 12. Locking of the said extending portion 32 to the latter is accomplished by screwing the nut 40 in a direction out of the bore 16, that is, towards the gap of the frame 11. This action causes the threads 41 of the nut 40 to ride up over the tapered screw-threads 42 on the extension 32, thereby clamping the same to the spindle 12 in the manner before described. If the adjustment here spoken of has been made and the said spindle is set to a predetermined measurement, the introduction between the calipering faces of the same and the anvil 13, of a work-piece possessing an increased increment in size, will displace the spindle 12 with its sleeve 20 and the barrel member 24, axially away from the hub 15. The travel or motion which occurs between the last enumerated parts, is obviously equal to the amount that the piece measured exceeds the initial setting of the micrometer. But, as previously stated, just as soon as the shoulder 38 of the barrel member recedes from the hub's face 39, the secondary element 50, under the influence of its spring 55, moves angularly as well as lengthwise over the threaded portion 47, as far as the displacement thereof permits, that is until the bottom 62 of the recess 53 contacts with the face 39 of the hub member. The registered tolerance increment can be quickly determined by consulting the graduations 59, 60. Even the withdrawal of the work-piece from between the spindle and the anvil, does not disturb the setting or reading obtained, because the spring 36 imposes a constant compression stress intermediate the internal shoulder 62 of the element 50 and the outer face 39 of the hub member. A slight manipulation is required to reset or restore the secondary sleeve to its initial or neutral position, as also to bring the terminal shoulder 38 of the barrel member against the same face of the hub 15. When the coacting transversely parallel surfaces of the knurled flange 45 of the nut 40 and the inner end of the hub-member are screwed into close juxtaposition, the secondary registering element is rendered inoperative, that is to say, the instrument can then only be used for taking measurements of various sizes, obtainable solely by rotative adjustment of the primary element 20, as with ordinary micrometers.

While a certain preferred embodiment of this device has been shown and described, it will be understood that changes in the form, arrangements, proportions, sizes and details thereof may be made, without departing from the scope of the invention as defined by the appended claims.

Having described my invention what I desire to secure by Letters Patent and claim, is:—

1. In an instrument of the character described and provided with a measuring spindle, the combination with said spindle, of a primary member and element adapted to register rotative movement of said spindle, and a secondary member and element independent of said first named member and spindle capable of recording axial motion imparted to the said spindle while the latter is held against rotation.

2. In an instrument of the character described and provided with a measuring spindle, the combination with said spindle, of a primary set including a member and element capable of registering rotation of the spindle and translatable together therewith relatively to the frame of the instrument, a secondary set comprising a member and element adapted to record the translative movement of the said spindle, and means for converting translation imparted to said primary set into revolving displacement intermediate the member and element of said secondary set.

3. In an instrument of the character described and provided with a measuring spindle, the combination with said spindle, of a primary set comprising a member and element adapted to register rotative movment of the spindle, means enabling conjoint translation of the spindle and said set relatively to the frame of the instrument, and a device coacting with the said set capable of recording the translative motion imparted to the said spindle.

4. In an instrument of the character described and provided with a measuring spindle, the combination with said spindle, of a set including a member and element revolvable one relatively to the other for registering rotative movement of the spindle, being translatable conjointly therewith relatively to the frame of the instrument, and means for recording the translative motion imparted to the said spindle and said set without affecting interrelative adjustment between the member and element thereof.

5. In an instrument of the character described and provided with a measuring spindle, the combination with said spindle, of a member and element for recording rotative movement of the spindle capable of partaking in a limited translation therewith relatively to the frame of the instrument, means for locking the spindle against rotation while permitting it to be axially displaced, and means co-acting with said member for registering axial translation of the said spindle.

6. In an instrument of the character described and provided with a measuring spindle, the combination with the frame of the instrument and said spindle, of a member and element capable of recording rotative movement of said spindle, means enabling said member and the element to receive limited longitudinal motion in said frame to register axial displacement of the spindle, and means for holding the member against such movement while permitting the spindle to revolve relatively thereto.

7. An instrument of the character described including in combination with a measuring spindle, a primary set comprising a member and element adapted to register rotative movement of said spindle, a secondary set consisting of a member and element capable of recording axial motion of the spindle, and means for rendering one of said sets inoperative while the other set remains effective.

8. An instrument of the character described including in combination with a frame and a measuring spindle, a primary set comprising a member and element adapted to register rotative motion of said spindle, being conjointly translatable therewith relatively to said frame, a secondary set consisting of a member and element capable of recording translation of the spindle and said primary set, and means effecting interrelative movement between the member and element of said secondary set upon translation of the primary set with the said spindle.

9. An instrument of the character described including in combination with a frame and a measuring spindle, a primary set comprising a member and element adapted to register rotative movement of said spindle, being translatable therewith relatively to said frame, a secondary set embracing a member and element capable of recording translation of said primary set and the spindle, and means for restoring the last mentioned set and the spindle to initial position subsequent to replacing said secondary set to its normal setting.

10. An instrument of the character described including in combination with a frame and a measuring spindle, a primary set comprising a member and element adapted to register rotative movement of said spindle, means enabling translation of the latter and said set relatively to said frame, a secondary set embracing a member and element capable of recording the translative motion of the spindle and the primary set, and means for limiting the last mentioned motion.

11. An instrument of the character described including in combination with a frame and a measuring spindle, a primary set comprising a member and element adapted to register rotative movement of said spindle and translatable therewith in said frame, a secondary set embracing a member and element capable of recording the translative motion of the spindle and said primary set, means tending to restore the last mentioned set with the spindle to initial position subsequent to their translation, and other means acting in opposition to said first named means serving to effect during the translation of the primary set and the spindle interrelative displacement between the member and element of said secondary set.

12. An instrument of the character described including in combination with a frame and a measuring spindle, a primary set comprising a member and element adapted to register rotative movement of said spindle, being translatable conjointly therewith relatively to said frame, a secondary set consisting of a member and element capable of recording the translatory motion of the spindle and said primary set, the element of said secondary set being carried by the member of the primary set, the member of the secondary set forming a portion of the frame, and initially tensioned means tending upon translation of the primary member to displace the initial setting of the element of the said secondary set with respect to the members of both sets.

13. An instrument of the character described including in combination with a frame and a measuring spindle, a spindle capable of axial movement upon endwise pressure being applied thereto, an element associated with the latter so as to be conjointly translatable therewith, means for imparting rotation to said element independently of said spindle, and means for limiting the rotation of the element relatively to the displacement of the spindle.

OSCAR V. KARLSSON.